United States Patent [19]

Barkatt et al.

[11] Patent Number: 4,654,146

[45] Date of Patent: Mar. 31, 1987

[54] ION EXCHANGER TO SEPARATE HEAVY ALKALI METAL IONS

[75] Inventors: Aaron Barkatt, Silver Spring, Md.; Pedro B. Macedo, 6100 Highboro Dr., Bethesda, Md. 20817

[73] Assignees: Pedro B. Macedo, Bethesda; Theodore Aaron Litovitz, Annapolis, both of Md.

[21] Appl. No.: 715,207

[22] Filed: Mar. 25, 1985

[51] Int. Cl.$^4$ .............................................. B01D 15/04
[52] U.S. Cl. ................................... 210/670; 210/674; 210/679; 210/682
[58] Field of Search ............... 210/670, 674, 679, 682; 423/6

[56] References Cited

U.S. PATENT DOCUMENTS

| 2,853,525 | 9/1958 | Wittig et al. | 260/606.5 |
|---|---|---|---|
| 2,982,785 | 5/1961 | McKenzie et al. | 260/606.5 |
| 3,017,242 | 1/1962 | Ames | 210/682 |
| 3,096,370 | 7/1963 | Bloom et al. | 260/543 |
| 3,167,504 | 1/1965 | Hayden et al. | 210/682 |
| 3,207,607 | 9/1965 | Migicovsky | 210/682 |
| 3,296,123 | 1/1967 | Prout et al. | 210/682 |
| 3,316,066 | 4/1967 | Smit | 210/682 |
| 3,453,214 | 7/1969 | Bonnin et al. | 210/679 |
| 3,468,959 | 9/1969 | Moore et al. | 260/606.5 |
| 3,484,216 | 12/1969 | Ahrland | 210/682 |
| 4,178,270 | 12/1979 | Fujita et al. | 210/679 |
| 4,423,159 | 12/1983 | Ebra et al. | 521/35 |
| 4,432,893 | 2/1984 | Lee et al. | 252/631 |
| 4,460,474 | 7/1984 | Blasius et al. | 210/679 |

OTHER PUBLICATIONS

Hogness et al., *Qualitative Analysis and Chemical Equilibrium*, 5th Edition, 1966, pp. 349–359.
Korkisch, J., *Modern Methods for the Separation of Rarer Metal Ions*, Pergamon Press, 1969, pp. 266–291.
Popovych, *Solubility Data Series*, vol. 18, Tetraphenylborates, Pergamon Press, Feb. 1979, pp. 7–9, 62 and 63.

*Primary Examiner*—Ivars Cintins
*Attorney, Agent, or Firm*—Fleit, Jacobson, Cohn & Price

[57] ABSTRACT

A process for removing heavy alkali metal cations from solution comprising passing a liquid over a composition including a support such as charcoal having interconnected pores containing a tetra-aryl boron moiety associated with an ion exchangeable cation absorbed on the support capable of forming a stable compound with a heavy alkali metal cation.

19 Claims, No Drawings

ION EXCHANGER TO SEPARATE HEAVY ALKALI METAL IONS

BACKGROUND OF THE INVENTION

Methods used to separate cesium and other heavy alkali metal ions (K, Rb, Fr) from aqueous solutions include precipitation, solvent extraction and sorption on solid adsorbents or ion exchangers. Reagents used to precipitate such ions from solution have included sodium perchlorate, sodium chloroplatinate, sodium tricobalinitrite and sodium tetra-aryl boron compounds such as sodium tetraphenylboron (Hogness, Johnson and Armstrong, *Qualitative Analysis and Chemical Equilibrium*, 5th Edition, 1966, pp. 349–359). These compounds can be used to separate heavy alkali metal ions from the aqueous phase either by filtration or centrifugation of a precipitated solid or by means of solvent extraction of the product into an organic phase in which it is more highly soluble than in water.

For instance, U.S. Pat. No. 4,432,893 describes a process for the removal of the residual hazardous soluble values from a nuclear waste solution which comprises contacting the solution with sufficient sodium tetraphenylboron to precipitate the cesium present. Potassium is also precipitated. Simultaneously, sufficient sodium titanate is added to form an insoluble slurry which sorbs strontium and removes it from the waste supernate. The waste solution is then filtered to separate the solution substantially decontaminated of the hazardous cesium and strontium values.

The filtration step can be avoided. For instance, U.S. Pat. No. 2,982,785 describes a process of separating cesium values from an aqueous solution which comprises adding a sodium tetraphenylboron solution in hexone (preferably at a concentration of about 0.1M) to the aqueous cesium solution (which preferably has a pH value of from 2 to 13) whereby cesium tetraphenylboron is formed and taken up in a hexone phase, and separating the hexone phase from an aqueous raffinate.

The main application of the various techniques to remove cesium from aqueous solutions is the decontamination of streams in the nuclear industry which contain the radioactive isotopes Cs-134 ($\tau_{\frac{1}{2}}=2.05$ years), Cs-135 ($\tau_{\frac{1}{2}}=3\times 10^6$ years), CS-136 ($\tau_{\frac{1}{2}}=13$ days) and CS-137 ($\tau_{\frac{1}{2}}=30.2$ years). These radioactive species are present in solution in the form of the Cs+ ion. However, in the nuclear industry one often encounters solutions which cannot be decontaminated by means of materials which have been used to remove cesium ions from solutions such as organic cation exchangers, zeolites and silica-based glasses and gels such as the Durasil-10 ion-exchanger. For instance, one of the major fission product streams obtained in re-processing irradiated fuel at the Savannah River Plant, Department of Energy, will contain approximately 7.1M Na+, 0.015M K+ and 0.0004M Cs+, and the pH will be approximately 14 as the result of the presence of 1M NaOH and of other basic salts. Under these conditions, the exchange capacity of organic ion-exchange resins for cesium is very low because of the high content of other alkali ions, while silicates and aluminosilicates undergo very rapid corrosion in the highly alkaline medium.

Accordingly, it is an object of this invention to provide a process for the recovery of heavy alkali metal cations from liquids which is simple and does not require any special equipment.

It is also an object of this invention to provide a process for the selective recovery of heavy alkali metal cations from liquids that contain more than one heavy metal cation and particularly for the selective recovery of cesium from liquids that contain salts other than cesium in high concentrations and the cesium in substantially lower concentrations.

It is further an object of this invention to provide a process for the recovery of heavy alkali metal cations from aqueous solutions which can be carried out from alkaline as well as acid solutions.

SUMMARY OF THE INVENTION

In accordance with the present invention, a process is provided for removing heavy alkali metal cations such as cesium from a liquid containing the heavy alkali metal cations. The process includes passing the liquid over a composition having a porous support with interconnected pores. The composition is characterized in that its internal surface contains a tetra-aryl boron moiety associated with an ion exchangeable cation capable of ion exchanging and forming a stable compound with a heavy alkali metal cation. The tetra-aryl boron moiety is present in an amount effective to ion exchange the heavy alkali metal cations. The process forms a compound by ion exchange between the tetra-aryl boron moiety of the composition and the heavy alkali metal cations.

The tetra-aryl boron moiety and associated ion exchangeable cation is preferably sodium tetraphenylboron. Sodium tetraphenylboron is known to be very effective in forming highly insoluble compounds with the heavy alkali metal ions (e.g., U.S. Pat. No. 2,853,525 and J. Korkisch, *Modern Methods for the Separation of Rarer Metal Ions*, Pergamon Press, 1969, pp. 266–291). Furthermore, cesium tetraphenylboron is much less soluble than the corresponding rubidium compound, which, in its turn, is much less soluble than the potassium salt. (Popovych, *Solubility Data Series*, Volume 18, Tetraphenylborates, Pergamon Press, February 1979, pp. 7–9, 62 and 63). This property makes this reagent particularly useful in effecting selective separations when more than one heavy alkali metal ion is present in solution.

The porous support in accordance with the present invention is preferably charcoal. The charcoal is prepared by the destructive distillation of wood such as nut shells (e.g., coconut shells).

The process is preferably run continuously using a column, and includes a complete operating cycle, including elution, re-generation and solidification of the eluted cesium or other heavy alkali metal. The process is particularly useful in the case of aqueous streams which are highly radioactive (precluding the use of organic resins), highly alkaline (precluding the use of glasses, zeolites, etc.), contain a large excess of potassium over cesium (requiring high selectivity) and large concentrations of cesium itself (requiring substantially high capacities).

The present invention provides an improvement over prior art processes such as disclosed in Lee et al U.S. Pat. No. 4,432,893. In the Lee et al process, sufficient sodium tetraphenylboron must be present to precipitate substantially all of the cesium, substantially all of the potassium and further to exceed the solubility limit of sodium tetraphenylboron at the concentration of sodium in solution. Relative to the present process, a long contact time is required if ion exchange between the sodium tetraphenylboron precipitate and cesium ions in the supernate is relied upon to achieve higher cesium decontamination factors. The Lee et al process also is less desirable than the present invention from the standpoint of convenience. The Lee et al process requires filtration, preferably cross-flow filtration, whereas the present invention can be operated using a simple ion exchange column in which the sodium tetraphenylboron or other tetra-aryl boron moiety and associated ion exchangeable cation is supported on a support. Finally, the Lee et al process is not selective in separating cesium from potassium. By contrast, the present invention achieves such selectivity without using excess sodium tetraphenylboron, in a relatively short period of time and by a much simpler process.

DESCRIPTION OF THE PREFERRED EMBODIMENTS

The present invention is directed toward removing heavy alkali metal cations from a liquid, usually an aqueous solution, containing the heavy alkali metal cations. As used herein, "heavy alkali metal" is defined to include potassium, rubidium, cesium and francium.

The process includes passing the aqueous solution or other liquid over a composition including a porous support having interconnected pores and characterized in that its internal surface contains a tetra-aryl boron moiety associated with an ion exchangeable cation. The porous support is preferably charcoal. Charcoal is a form of amorphous carbon and is obtained from the destructive distillation of wood, sugar, coal and other carbonaceous materials. The term "charcoal" is intended to include the so-called activated carbons which are produced by gas or chemical treatment to create a very large surface area. Specifically, activated carbon has a large specific area and is designed for absorption from the gas and liquid states. The specific area of activated carbon can range from about 500 to 2000 m$^2$/g, more typically about 800 to 1500 m$^2$/g. Activated granular and powdered carbon includes a porous structure created by the steps of driving off constituents from the carbonaceous raw materials and partially oxidizing the residue. The oxidation typically is conducted by means of steam, flue gas, air or carbon dioxide. The charcoal used in accordance with the invention is preferably produced from wood such as coconut or other nut shells. Suitable charcoal is available from Fisher Scientific Company, Pittsburgh, Pa., and Barnebey-Cheney, Columbus, Ohio. While the preferred support is charcoal, an organic resin support could be used with aqueous streams which are not highly radioactive.

Referring to the tetra-aryl boron moiety associated with an ion exchangeable cation, the tetra-aryl boron moiety is preferably tetraphenylboron and the ion exchangeable cation is preferably sodium. Sodium tetraphenylboron can be produced by reacting phenylmagnesium bromide with a boron trihalogenide in the ratio of 4 moles of phenylmagnesium bromide per each mole of boron trihalogenide under normal Grignard reaction conditions so as to form a reaction mass including boron tetraphenylmagnesium halogenide; and treating said boron tetraphenylmagnesium halogenide in aqueous solution with a water-soluble inorganic sodium salt so as to form sodium tetraphenylboron (see U.S. Pat. No. 2,853,525).

The terminology "tetra-aryl boron" as used herein, also referred to in the literature as tetra-aryl borate, tetra-aryl boride, and, in U.S. Pat. No. 3,096,370, as tetra-aryl borohydride, includes a broad class of materials of the general formula:

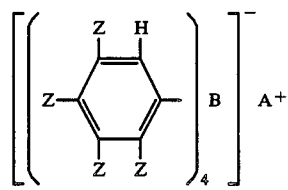

In this formula, Z may be H, halogen, lower alkyl, lower alkoxy, acetamide, or dialkylamino, and A may be a Group I or Group II metal or complex metal ion such as MgBr$^+$ or Mg-halogen complex, or a lower alkyl-substituted ammonium cation such as (CH$_3$)$_4$N$^+$, or a substituted or fused-ring pyridinium cation, such as

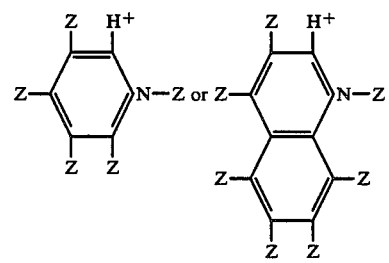

As shown in U.S. Pat. No. 3,096,370, compounds belonging to this general class, e.g., sodium tetra-p-tolylboron and potassium tetra-6-chlorophenylboron, exhibit the same type of chemical behavior, e.g., in reactions with boron trihalides. The compounds in the broad class which are useful in the present invention are those which form a stable compound with a heavy alkali metal ion. The terminology "tetra-aryl boron" is also intended to include tetra-aryl borons of the above formulas in which the four aryl groups are not identical. For example, U.S. Pat. No. 3,468,959 shows that sodium tetrakis-(p-fluorophenyl)boron is particularly useful in effecting selective precipitation of cesium from solutions containing potassium and/or rubidium cations.

The terminology "ion exchangeable cation" is intended to include a cation which is compatible with the tetra-aryl boron moiety and will ion exchange with the heavy alkali metal cations. Suitable ion exchangeable cations include, in addition to sodium, lithium, potassium and ammonium.

The tetra-aryl boron anion and associated cation should be present in the composition in an amount effective to ion exchange the heavy alkali metal cations and form a compound by ion exchange between the tetra-aryl boron moiety of the composition and the heavy alkali metal cations. The amount of tetra-aryl boron moiety immobilized on the support is generally at least about 0.1% by dry weight, preferably about 10 to 50%, and more preferably about 30 to 40%.

The tetra-aryl boron anion and associated cation are immobilized on the support by contacting the support with the tetra-aryl boron anion and associated cation dissolved in an aqueous medium or a polar organic solvent (e.g., ethanol). The pH of the aqueous medium or polar organic solvent is preferably above about 2, more preferably above about 4.

The proportion of tetra-aryl boron anion and associated cation immobilized to the support can be regulated by several techniques. Longer times of contact of the aqueous or polar organic solvent solution of the chemicals with the support will increase the proportion of the tetra-aryl boron anion and associated cation which is immobilized on the support. Also, the smaller the particle size of the support, the greater the proportion of the chemicals that will be affixed within a given time. Any other suitable techniques such as varying the concentration can be used to regulate the proportion of the tetra-aryl boron anion and associated cation affixed to the porous support. In general, as much tetra-aryl boron anion and associated cation is immobilized on the support as is possible within a practical contact time, etc.

It is believed that at least some of the tetraphenylboron and associated cation is joined to the charcoal support. However, in some cases, a proportion of the tetraphenylboron and associated cation is simply deposited on or within the pores of the charcoal with little, if any, chemical bonding to the support.

The support having the tetra-aryl boron anion and associated cation immobilized thereon is then contacted with the waste stream containing the heavy alkali metal cations. This contact can take place in a packed exchange or mixed bed column or in a suitable canister. Dilute solutions having less than $10^{-9}$ curie radioactivity per milliliter as well as very concentrated solutions, e.g., those having as high as 0.1 curie/ml or more radioactivity can be treated by this invention. Moreover, the invention is useful in treating alkaline solutions having a pH as high as above 13, mildly acidic solutions having a pH greater than or equal to about 2, and neutral solutions.

The present invention can be used for the selective recovery of heavy alkali metal cations from liquids containing more than one heavy metal cation. Particularly, the present invention can be used for the selective recovery of cesium from liquids that contain salts other than those of cesium in high concentrations and the cesium in substantially lower concentrations. For example, cesium can be selectively recovered from solutions containing both cesium and sodium or potassium, particularly from solutions containing sodium or potassium salts in high concentrations, such as above about 0.1 molar, and cesium in substantially lower concentrations.

It has been observed that 1 unit volume of charcoal or other support can "concentrate" the metal species contained in more than 20 volumes of waste water. The term "column volume" (CV) is often used in this context and means 1 volume of liquid (water) per 1 volume of charcoal or other support.

The ion exchange column can be eluted with an acid or an organic solvent. Suitable acids include organic acids such as formic acid and mineral acids such as nitric and phosphoric acid. The acid is preferably a relatively strong acid having a pH below about 2. When an acid is used, the tetra-aryl boron compound on the support is destroyed. However, when using an organic solvent such as N-methyl-2-pyrrolidone, gamma-butyrolactone, dimethylsulfoxide or acetone, the tetra-aryl boron compound is not destroyed.

It is also possible to reverse ion exchange the ion exchange or other column after it is exhausted to regenerate the column. The column is regenerated by contacting the composition with a solution of an ion exchange cation such as an aqueous ammonium-ion containing solution (e.g., aqueous ammonium carbonate solution). The ammonium-ion containing solution should have a pH above about 2, preferably above about 4. Treatment of the column with an ammonium-ion containing solution elutes and regenerates the column.

EXAMPLES

Sodium tetraphenylboron (NaTPB) was loaded on a charcoal matrix, which is highly resistant to attack by alkalis, and the resulting loaded material used to remove cesium from non-radioactive simulated Savannah River Plant streams.

Experiments with NaTPB-doped charcoal are described below. In these experiments, the capacities were estimated at the point where the effluent concentration is half the concentration of the influent (decontamination factor of 2).

EXAMPLE 1

This experiment consisted of mixing 10 mL of Barnebey-Chaney (Columbus, Ohio) UU-type steam activated coconut shell carbon ($-50+200$ mesh) with a solution of 1 g NaTPB in 100 mL of de-ionized water for 5 hours. The carbon was permitted to settle and the supernatant solution discarded and replaced by the same volume of fresh 1% NaTPB solution. The activated carbon was mixed with the new solution for 16 hours and then the solution was poured off. A volume of 4 mL of the activated carbon was loaded into a column. A volume of 500 mL of simulated Savannah River Plant high-cesium solution (4M $NaNO_3$, 1M $NaNO_2$, 1M $NaOH$, 0.5M $NaAlO_2$, 0.3M $Na_2SO_4$, 0.3M $Na_2CO_3$, 0.015M $KNO_3$, 0.0004M $CsNO_3$) was prepared and passed through the column at a flow rate of 1.6 mL/min (residence time of 2.5 minutes). The cesium concentration in the effluent was monitored by means of flame emission as a function of the volume passed through the column. The capacity for this column was 35 column volumes.

The results indicate that $Cs^+$ is sorbed on the column in preference to $K^+$, which is present in large excess over $Cs^+$ in the influent. The solubility of CsTPB is lower by a factor of 4.2 than that of KTPB (O. Popovych, Solubility Data Series, Vol. 18-Tetraphenylborates, Pergamon Press, Oxford, 1981) and the use of a column makes it possible to utilize the selectivity of TPB precipitation for Cs over K much more than a single-stage precipitation stage.

Following experiments similar to this example, it was found possible to elute 6% of the sorbed cesium with 1 column volume and 13% with 6 column volumes of 17:3 γ-butyrolacetone-water mixture. Using a 3.75M nitric acid solution, the corresponding fractions of Cs eluted were 51% with 1 column volume and 64% with 8 column volumes. Significant amount of elution was also observed in a 23:2 acetone-water mixture.

EXAMPLE 2

Two batches of NaTPB-doped charcoal were prepared. Batch A was prepared using the procedure detailed in Example 1. Batch B was prepared substituting a 3% NaTPB for the 1% NaTPB solution used in Example 1 and otherwise using the same procedure. BAMBP-doped charcoal was prepared by similarly treating UU-type charcoal with a 2% solution of 4-sec-butyl-2(alpha-methylbenzyl)phenol in ethanol. Ammonium-12-molybdophosphate (AMP) was used without any further treatment. AMP is a commonly used sorbent for the heavier alkali ions. A static sorption experiment was carried out on the simulated Savannah River Plant high-cesium solution described in Example 1. In this experiment, a volume of 1 mL of each of the powders was manually shaken with 10 mL of the solution for 2 minutes, permitted to stand for 30 minutes, shaken again for 2 minutes, and the operation repeated 6 times in all, i.e., for a total duration of 3 hours. The results of the solution analysis are given in Table 1.

TABLE 1

| Sorbent | Cs concentration, mg/L |
|---|---|
| None | 55 |
| AMP | 54 |
| BAMBP-doped charcoal | 49 |
| NaTPB-doped charcoal, Batch A | 21 |
| NaTPB-doped charcoal, Batch B | 6 |

It was concluded that NaTPB-doped charcoal is far superior than either AMP or BAMBP-doped charcoal.

EXAMPLE 3

Three 5-mL batches of Barnebey-Chaney UU-type activated carbon ($-50+200$ mesh) were treated with tetraphenylboron (TPB). Each batch was treated twice, each time with 50 mL of freshly prepared aqueous solution of sodium tetraphenylboron. The concentrations of the solutions in the three cases were 25, 50 and 100 g/L, respectively. Calculated TPB loadings on the charcoal (calculated from B analysis) were 270, 360 and 390 g/L, respectively. The Cs capacities obtained in an experiment carried out with the same influent used in the preceding examples were approximately 55, 65 and 80 column volumes, respectively, using 3-mL treated charcoal columns and flow rates of 1.5 mL/min (2-minute residence time). However, as noted above, these capacities were estimated at the point where the effluent concentration is half the concentration of the influent (decontamination factor of 2). Actually, total capacities are significantly higher since effluent concentrations level off at considerably lower levels than the influent concentration when a large volume of influent has passed through the column, probably due to a slow exchange of K by Cs after the initial rapid Cs-Na replacement. In the latter two runs, the DF was still 1.7 when 150 column volumes of influent have been passed through the column.

EXAMPLE 4

In this example, tracer amounts of the radioactive isotope Cs-137 were used in a sorption experiment on NaTPB-treated charcoal in addition to high concentrations of non-radioactive cesium and other alkali ions.

NaTPB-treated charcoal was prepared by stirring together a volume of 10 mL of UU-type activated carbon (see Example 1) with a solution of 10 g of NaTPB in 100 mL of pure ethanol. The carbon was permitted to settle for 30 minutes, the supernatant solution was discarded, and the carbon was stirred for 16 hours with a second 100-mL volume of 100 g/L NaTPB in ethanol. After standing for 30 minutes, the supernate was discarded and the entire volume of 10 mL of NaTPB-treated carbon was loaded onto a column. A simulated Savannah River Plant (SRL) high-cesium solution (pH 14) as detailed in Example 1 was prepared and spiked with a concentration of 5.0 $\mu$Ci/L of Cs-137. The solution was passed through the column at a flow rate of 10.5 mL/hr. (residence time of 57 minutes). The Cs-137 activity in the effluent was monitored as a function of the volume passed through the column by means of a sodium iodide detector and a multi-channel analyzer. After passing 131 column volumes of the influent, the column was eluted with 19 column volumes of a solution of approximately 800 grams of ammonium carbonate monohydrate (($NH_4)_2CO_3.H_2O$) in 1 liter of de-ionizied water. The column was washed with 5 column volumes of de-ionized water. The cycle of loading, elution and water wash was repeated two more times. The results are shown in Table 3, which lists the number of Cs-137 gamma counts (661.63 keV) obtained for 20-mL samples of the influent and effluent solutions in 10 minutes of counting. The decontamination factor (DF) corresponding to each sample was obtained by dividing the number of counts obtained with the influent sample by the corresponding number obtained with each of the effluent samples.

The results show that NaTPB charcoal has a large capacity (about 100 column volumes) and high decontamination factor (above 2000 during the first 85 column volumes) in a single-pass purification of a radioactive, highly saline and alkaline cesium-containing stream. Furthermore, the cesium can be eluted in a relatively small volume (less than 10 column volumes) of aqueous ammonium carbonate, yielding eluates which are more concentrated by a factor of up to 12 with respect to cesium compared with the original stream.

After the ammonium carbonate elution, the regenerated column can be used to remove cesium from further volumes of influent. The capacity of column for cesium removal (down to a decontamination factor of 2) is 103 column volumes during the first cycle (see above), 68 column volumes during the second cycle and 39 column volumes during the third cycle.

EXAMPLE 5

The examples detailed so far demonstrate that cesium can be effectively sorbed from aqueous media which contain a large excess of sodium and potassium using NaTPB-treated charcoal. The experiment described below was undertaken in order to find out to which extent cesium can be separated from the other alkali ions by means of sorption and subsequent elution from a NaTPB-treated column.

A simulated Savannah River influent was prepared according to the formulation given in Examples 1–4. The results of the influent analysis were ($151600\pm2000$) mg/L Na, ($1176\pm11$) mg/L K (both elements determined by dc plasma spectrometry), and ($49.4\pm1.6$) mg/L Cs (determined by flame emission). Accordingly, the measured Na:Cs ratio in the influent was approximately 3070, and the corresponding K:Cs ratio was 24. The pH of the influent was 14. NaTPB-treated charcoal was prepared according to the procedure detailed in Example 4, a 4-mL column was loaded and the influent was passed through the column at a flow rate of approximately 1 mL/min. After 435 mL of influent (109 column volumes) were passed through the column, the column was rinsed with three 10-mL volumes of de-ionized water and then eluted with 100 mL of approximately 800 g/L ($NH_4)_2CO_3.H_2O$. The concentrations of Cs, K and Na in the eluate are given in Table 2 as a function of the combined number of column volumes of water and ammonium carbonate solution passed through the column.

TABLE 2

| Solution | Column Volumes | Concentration, mg/L | | |
|---|---|---|---|---|
| | | Cs | K | Na |
| Water | 2.5 | 5.8 | 1443 | 63347 |
| " | 5.0 | 1.0 | 260 | 10493 |
| " | 7.5 | 0.27 | 53 | 1791 |
| ag. (NH$_4$)$_2$CO$_3$ | 8.0 | 0.08 | 16 | 648 |
| " | 8.5 | 244 | 1006 | 10755 |
| " | 9.0 | 1352 | 450 | 3729 |
| " | 9.5 | 1398 | 110 | 930 |
| " | 10.0 | 1192 | 47 | 441 |
| " | 10.5 | 1239 | 26 | 136 |
| " | 11.0 | 1041 | 19 | 61 |
| " | 11.5 | 624 | 16 | 55 |
| " | 12.0 | 499 | 16 | 31 |
| " | 12.5 | 386 | 16 | 35 |
| " | 13.5 | 306 | 16 | 37 |
| " | 14.5 | 225 | 12 | 26 |
| " | 15.5 | 159 | 11 | 27 |
| " | 16.5 | 115 | 12 | 15 |
| " | 17.5 | 90 | 13 | 40 |
| " | 18.5 | 64 | 6.6 | 24 |
| " | 19.5 | 45 | 5.0 | 20 |
| " | 20.5 | 27 | 3.9 | 10.4 |
| " | 21.5 | 22 | 4.9 | 11.5 |
| " | 22.5 | 16 | 4.2 | 9.3 |
| " | 25.0 | 12 | 7.0 | 9.3 |
| " | 27.5 | 8.4 | 10.3 | 10.4 |
| " | 30.0 | 4.8 | 8.3 | 6.0 |
| " | 32.5 | 3.8 | 8.2 | 5.3 |

These results show that it is possible to recover most of the cesium from the column into a solution which contains relatively small amounts of Na and K. For instance, if the fraction of the ammonium carbonate eluate comprising column volumes 9–19.5 is collected, then according to the results shown in Table 4 approximately 95% of the cesium accumulated on the column is recovered in a solution which contains 464 mg/L Cs, 41 mg/L K and 276 mg/L Na. In other words, the Cs:Na ratio in the eluate is higher by a factor of 5200 than the corresponding ratio in the original solution, and the K:Na ratio in the eluate is higher by a factor of 270 than the corresponding ratio in the original solution. The separation of Cs from Na and K is achieved in part during the sorption process and in part during the elution process. The eluate still contains high levels of ammonium carbonate, but this compound can be removed by thermal decomposition and volatilization. The pH of the eluate was observed to be mildly basic (11–10).

EXAMPLE 6

The experiment described below was undertaken in order to find out whether the separation of cesium from other alkali ions by means of sorption on a NaTPB-treated charcoal column can be improved by using a sequence of several eluant compositions.

The experiment was identical with the one described in Example 5, except for the fact that following the rinse with three 10-mL volumes of de-ionized water the column was eluted first with 60 mL of a dilute solution (approximately 80 mg/L) of (NH$_4$)$_2$CO$_3$.H$_2$O and then with 60 mL of a concentrated solution (approximately 800 mg/L) of (NH$_4$)$_2$CO$_3$.H$_2$O.

The results show that in this case approximately 72% of the cesium in the column are extracted in the dilute (NH$_4$)$_2$CO$_3$ solution (9–23 column volumes) with an average composition of 128 mg/L Cs, 34 mg/L K and 101 mg/L Na. The Cs:Na ratio is higher by a factor of 3890 and the Cs:K is higher by a factor of 90 than the corresponding ratios in the influent. A second fraction of the cesium (approximately 16%) is eluted during the initial stages of the subsequent elution with concentrated (NH$_4$)$_2$CO$_3$ (23.5–27.5 column volumes). The eluate composition is 96 mg/L Cs, 18 mg/L K and 7.8 mg/L Na. The Cs:Na ratio is higher by a factor of 37800 and the Cs:K ratio is higher by a factor of 128 than the corresponding ratios in the original solution. It should be noted that the Cs:Na and Cs:K enrichment factors drop again during the removal of the last traces of Cs from the column.

It is concluded that graded elution with a sequence of eluants makes it possible to obtain highly pure Cs solutions with very low levels of sodium contamination. It should be noted that even better separations of cesium from other alkali metal ions can be expected if sorption-elution cycles, such as those described in Examples 5 and 6, are repeated several times.

EXAMPLE 7

The experiments detailed in Examples 1–6 were all carried out with simulated Savannah River Laboratory solutions, which are highly saline (7M Na$^+$), highly alkaline (pH<14) and contain relatively large concentrations of Cs (approximately 0.3 mM). However, there are many other streams in the nuclear industry, including resin regeneration and decontamination solutions which are highly alkaline but contain much lower levels of Cs. The experiment described in this example was undertaken in order to characterize the performance of NaTPB-treated charcoal in the removal of cesium from such streams.

NaTPB-treated charcoal was prepared according to the procedure described in Example 4. A solution of 6 mg/L Cs (introduced as CsNO ) in 1M NaOH was prepared and passed through a 4-mL column of this charcoal at a flow rate of 2 mL/min (residence time of 2 minutes). The results show that in this stream, which contains about 10 times less cesium than the influent used in Examples 1–6 but is still very high (6 mg/L Cs) compared with low-level streams, the capacity of the NaTPB-treated charcoal is approximately 1250 column volumes.

The performance of NaTPB-treated charcoal under these conditions is unique because of its high selectivity for Cs (organic cation exchange resins are not expected to have high capacities because of the high concentration of NaOH) and high durability (inorganic silicate and aluminosilicate ion-exchangers are rapidly corroded and dissolved in 1M NaOH).

What is claimed is:

1. A process for removing heavy alkali metal cations from a liquid containing said heavy alkali metal cations which comprises passing said liquid over a composition including a porous support having interconnected pores, and characterized in that its internal surface contains a tetra-aryl boron moiety associated with an ion exchangeable cation capable of ion exchanging and forming a stable compound with a heavy alkali metal cation, said tetra-aryl boron moiety being present in an amount effective to ion exchange the heavy alkali metal cations, and forming a compound by ion exchange between the tetra-aryl boron moiety of said composition and said heavy alkali metal cations.

2. The process of claim 1 wherein said tetra-aryl boron moiety is tetraphenylboron.

3. The process of claim 2 wherein said ion exchangeable cation is sodium.

4. The process of claim 1 wherein said liquid is a aqueous solution.

5. The process of claim 1 wherein said heavy alkali metal cation is cesium.

6. The process of claim 5 wherein said cesium is radioactive cesium.

7. The process of claim 1 wherein said porous support is charcoal.

8. The process of claim 7 wherein the specific area of said charcoal is about 500 to 2000 $m^2/g$.

9. The process of claim 7 wherein said charcoal is prepared by the destructive distillation of wood.

10. The process of claim 1 wherein said composition is eluted by passing an acid or organic solvent through said composition.

11. The process of claim 1 wherein said composition is regenerated by contacting it with a solution of an ion exchangeable cation.

12. The process of claim 11 in which said ion exchangeable cation solution is an aqueous ammonium-ion containing solution.

13. The process of claim 12 in which said aqueous ammonium-ion containing solution is an aqueous ammonium carbonate solution.

14. A process for selectively removing cesium from a liquid containing said cesium and Na or K ions which comprises passing said liquid over a composition comprising a charcoal support having interconnected pores, and characterized in that its internal surface contains a tetraphenylboron moiety associated with an ion exchangeable cation, said tetraphenylboron moiety being present in an amount effective to ion exchange the cesium, and forming a compound by ion exchange between the tetraphenylboron moiety of said composition and said cesium.

15. The process of claim 14 wherein said liquid has a pH above 12.

16. The process of claim 14 in which said Na or K concentration is above about 0.2 molar.

17. The process of claim 14 wherein the charcoal has a specific area of about 500 to 2000 $m^2/g$.

18. The process of claim 14 wherein said charcoal is prepared by the destructive distillation of wood.

19. The process of claim 14 wherein said cesium is radioactive cesium.

* * * * *